US009753688B2

(12) United States Patent
Aoyama et al.

(10) Patent No.: US 9,753,688 B2
(45) Date of Patent: Sep. 5, 2017

(54) MOTOR CONTROL SYSTEM FOR CONTROL OF A MOTOR AND A DISPLAY DEVICE

(71) Applicant: FANUC Corporation, Minamitsuru-gun, Yamanashi (JP)

(72) Inventors: Kazunari Aoyama, Minamitsuru-gun (JP); Kunitaka Komaki, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 82 days.

(21) Appl. No.: 14/457,208

(22) Filed: Aug. 12, 2014

(65) Prior Publication Data
US 2015/0054839 A1 Feb. 26, 2015

(30) Foreign Application Priority Data

Aug. 22, 2013 (JP) ................................. 2013-172622

(51) Int. Cl.
| | |
|---|---|
| G05B 19/18 | (2006.01) |
| G05B 19/414 | (2006.01) |
| G06F 3/14 | (2006.01) |
| G05B 19/35 | (2006.01) |
| G06F 13/42 | (2006.01) |
| G06F 3/147 | (2006.01) |

(52) U.S. Cl.
CPC .......... *G06F 3/1407* (2013.01); *G05B 19/18* (2013.01); *G05B 19/351* (2013.01); *G05B 19/414* (2013.01); *G06F 3/147* (2013.01); *G06F 13/4282* (2013.01); *G05B 2219/33221* (2013.01)

(58) Field of Classification Search
None
See application file for complete search history.

(56) References Cited

U.S. PATENT DOCUMENTS 7,366,935 B1 * 4/2008 Swenson ................... G06F 5/14
345/558
8,456,126 B2 * 6/2013 Tate ....................... G05B 11/26
318/600

(Continued)

FOREIGN PATENT DOCUMENTS

CN 2711986 Y 7/2005
CN 101013314 A 8/2007

(Continued)

OTHER PUBLICATIONS

Notification of Reasons for Refusal (along with its English-language translation) dated Dec. 2, 2014 in corresponding Japanese Patent Application No. 2013-172622.

(Continued)

*Primary Examiner* — Joni Richer
(74) *Attorney, Agent, or Firm* — Drinker Biddle & Reath LLP

(57) ABSTRACT

Provided is a motor control system of a numerical controller that can instruct a plurality of motors and display data on a display device by means of a single serial bus. An amplifier which controls the motor drives the motor based on a motor command received from the numerical controller via the serial bus. The display device display data on a screen based on display data received from the numerical controller via the serial bus.

6 Claims, 4 Drawing Sheets

(56) References Cited

U.S. PATENT DOCUMENTS

| | | | |
|---|---|---|---|
| 2004/0129688 A1* | 7/2004 | Mori | B23K 26/06 219/121.61 |
| 2005/0152197 A1* | 7/2005 | Cho | H04N 1/3247 365/221 |
| 2008/0052417 A1* | 2/2008 | Aoyama | H04L 1/0045 710/1 |
| 2008/0238351 A1 | 10/2008 | Aoyama et al. | |
| 2009/0125139 A1* | 5/2009 | Endo | G05B 19/4067 700/110 |
| 2012/0268394 A1* | 10/2012 | Hsu | G06F 1/1607 345/173 |
| 2014/0052319 A1* | 2/2014 | Taylor | G07C 5/008 701/22 |

FOREIGN PATENT DOCUMENTS

| | | |
|---|---|---|
| CN | 202110398 U | 1/2012 |
| JP | 2006-072399 A | 3/2006 |
| JP | 2008-242728 A | 10/2008 |
| JP | 4282132 B2 | 6/2009 |

OTHER PUBLICATIONS

Decision to Grant a Patent (along with its English-language translation) that issued in Japanese Patent Application No. 2013-172622, dated Feb. 10, 2015.

* cited by examiner

MOTOR CONTROL SYSTEM FOR CONTROL OF A MOTOR AND A DISPLAY DEVICE

RELATED APPLICATION DATA

This application claims priority under 35 U.S.C. §119 and/or §365 to Japanese Application No. 2013-172622 filed Aug. 22, 2013, the entire contents is incorporated herein by reference.

BACKGROUND OF THE INVENTION

1. Field of the Invention

The present invention relates to a motor control system which uses a numerical controller that performs both control of a motor and control of a display device.

2. Description of the Related Art

When a numerical controller of a machine tool transmits commands to a plurality of motors to control each of the motors, the motors are driven by a plurality of amplifiers depending on the number and the types of motors. In Japanese Patent Application Laid-Open No. 2008-242728, regarding such a numerical controller, a first mode in which the same number of serial bus control circuits as the number of amplifiers are provided and the amplifiers and the serial bus control circuits are connected by serial buses such as optical cables so that each of motors is separately controlled by the corresponding amplifier, and a second mode in which a single serial bus control circuit is provided, the serial bus control circuit and amplifiers are connected in series, and a numerical controller and the amplifiers are connected by serial buses are disclosed.

In addition, a technique is also known in which a display device which displays various types of information of a numerical controller is provided separately from the body of the numerical controller, and display data to be displayed on the display device is transmitted by a different serial communication channel from serial buses for motor control to display the display data on the display device. Furthermore, a technique is also known in which an external input/output interface such as a keyboard or a USB for operating a numerical controller is provided in a display device, and data from the external input/output interface is subjected to data communication by the same serial communication channel as that for display data.

FIG. 5 is a schematic view illustrating a connection state of the numerical controller, the motors, and the display device in the related art.

In a numerical controller 110, a serial bus control circuit 112 and a display device serial communication channel control circuit 116 are provided. A display device 120 is connected to the display device serial communication channel control circuit 116 by a serial bus 160. In addition, a first amplifier 131 is connected to the serial bus control circuit 112 by a serial bus 150. A first motor 141 is connected to the first amplifier 131 so that the first motor 141 is controlled by the first amplifier 131. The first amplifier 131 and a second amplifier 132 are connected to each other also by the serial bus 150. A second motor 142 is connected to the second amplifier 132 so that the second motor 142 is controlled by the second amplifier 132.

Although the data amount of a motor command transmitted to each of the amplifiers 131 and 132 by the numerical controller 110 is small, in order to realize the highly accurate control at high speed, communication needs to be performed at a high frequency at a constant interval.

FIG. 6 is a view illustrating the data configuration of the motor command in the related art.

The data of the motor command initially includes a start code which indicates the start of the data and subsequently includes a command for each of the motors such as a first motor command, a second motor command, . . . , an N-th motor command. Each of the amplifiers which receive the data extracts the command for the motor connected to the corresponding amplifier from the received data, and thereafter transmits the received data to the amplifier in the next stage (subsequent stage). In the same manner, the amplifier in the next stage also extracts the command for the motor connected to the corresponding amplifier from the received data, and thereafter transmits the received data to the amplifier in the next stage. Although not illustrated in FIG. 6, a point where the motor is not present has empty data as the data of the motor command.

FIG. 7 is a view illustrating the configuration of communication data of position information from each of the amplifiers to the numerical controller in the related art.

The communication data from each of the amplifiers initially includes a start code which indicates the start of the data and subsequently includes position information from each of the motors such as first motor position information, second motor position information, . . . , N-th motor position information. Each of the amplifiers which receive the data adds the position information of the motor connected thereto to the data and transmits the resultant data to the amplifier in the next stage (preceding stage). In the same manner, the amplifier in the next stage also adds the position information of the motor connected thereto to the data and transmits the resultant data to the amplifier in the further next stage (preceding stage).

FIG. 8 is a view illustrating the configuration of communication data for the display device in the related art.

The communication data initially includes SYNC data for communication synchronization and subsequently includes the display data. In a case where there is no communicating data, the SYNC data for communication synchronization is transmitted. In addition to the display data, input/output data (I/O data) is also transmitted.

Although not illustrated, the input/output data or data (HMI data) of a key input or the like from a keyboard is transmitted from the display device to the numerical controller.

In the above-described technique disclosed in Japanese Patent Application Laid-Open No. 2008-242728, the technique of connecting the numerical controller and the amplifiers of the motors by the serial buses is disclosed, but a technique related to the display device is not disclosed.

In the related art illustrated in FIG. 5, the technique related to the communication data for the display device 120 is also disclosed. However, the display data for the display device 120 is transmitted by using a serial bus in a different protocol from that of the serial bus for the motor control. Therefore, the number of serial buses and the number of serial bus control circuits 112 are increased, and thus the technique may become complex and cost may also increase.

SUMMARY OF THE INVENTION

An object of the invention is to provide a motor control system of a numerical controller capable of reducing the cost of serial bus control circuits, the accompanying connectors, and serial buses in the motor control system of the numerical controller.

A motor control system according to the invention includes: a numerical controller; at least one amplifier which drives a motor based on a motor command from the numerical controller; at least one display device which carries out screen display based on display data; and a single serial bus which connects the numerical controller, the at least one amplifier, and the at least one display device. The numerical controller includes a first transmission buffer, a second transmission buffer, and a serial bus control circuit. The numerical controller calculates the motor command for motor control, stores the calculated motor command in the first transmission buffer, and stores the display data in the second transmission buffer. The serial bus control circuit outputs the data stored in the first transmission buffer or the second transmission buffer to the serial bus, depending on the amplifier or the display device connected to the serial bus. The amplifier drives the motor based on the motor command received from the numerical controller via the serial bus. Further, the display device carries out screen display based on the display data received from the numerical controller via the serial bus.

According to the motor control system of the invention, the numerical controller, the amplifier which drives the motor, and the display device are connected by the single serial bus. Therefore, serial bus control circuits, the accompanying connectors, and serial buses are reduced in number, and thus the cost thereof can be reduced. In addition, the motor command for driving the motor and the display data for displaying on the display device are stored in the different transmission buffers so that data is output from any of the transmission buffers to the serial bus, depending on the amplifier or the display device connected to the serial bus. Therefore, the buffer storing the motor command and the buffer storing the display data are clearly separated from each other, and thus both types of data cannot be confused with each other. Even in a case where a plurality of amplifiers or a plurality of display devices are connected, control of each of the amplifiers or the display devices can be performed by separating the motor command and the display data from each other.

The numerical controller may divide the display data for the display device and outputs those divided pieces of output data, and the display device may include a buffer that receives and accumulates the divided pieces of display data which are transmitted and combines those divided pieces of display data into a single piece of data.

In this embodiment, the display data for the display device is divided and transmitted, and the divided pieces of display data which are transmitted are received and accumulated and combined into the single piece of data. Therefore, even in a case of display data which generally has a higher data amount than the data amount of the motor command, the display data can be sent and received by dividing and combining the data without interruption.

The display data for the display device may include external output data from the display device, in addition to the data used for carrying out screen display.

In this embodiment, the external output data from the display device is included as the display data in addition to the data used for carrying out screen display. Therefore, data from a keyboard or the like for operating the numerical controller can be subjected to data communication on the same serial communication channel as that of the display data along with the data used for carrying screen display.

A data length of the motor command per motor output from the numerical controller may be fixed, and a data length of the display data transmitted to the display device may be an integer multiple of the data length of the motor command.

In this embodiment, since the data length of the motor command is fixed and the data length of the display data is an integer multiple of the data length of the motor command when these types of data are transmitted, the data length of any of the data which is transmitted from the serial bus control circuit is the same as the fixed data length of the motor command or an integer multiple thereof. Therefore, there is no need to cope with data having various data lengths, and control of data transmission in the serial bus control circuit is facilitated.

The amplifier may output position information data of a motor connected thereto to the serial bus, the display device may output display device output data to the serial bus, and the numerical controller may receive the position information data and the display device output data which are output to the serial bus.

In this embodiment, the position information data of the motor from the amplifier and the display device output data from the display device are transmitted to the numerical controller via the serial bus. Therefore, the numerical controller can receive the position information of the motor and the display device output data of the display device by the single serial bus, and thus the cost can be reduced.

The display device may divide the display device output data and outputs those pieces of divided output data to the serial bus, and the numerical controller may include a buffer that receives and accumulates those divided pieces of output data which are output to the serial bus and combines those divided pieces of output data into a single piece of data.

In this embodiment, the display device output data from the display device is divided and transmitted, and the divided pieces of display data which are transmitted are received and accumulated in the numerical controller and combined into the single piece of data. Therefore, even in a case of display device output data which generally has a higher data amount than the data amount of the motor command, the display device output data can be sent and received by dividing and combining the data without interruption.

A data length of the position information data per motor output to the serial bus from the amplifier may be fixed, and a data length of the display device output data output to the serial bus from the display device may be an integer multiple of the data length of the position information data.

In this embodiment, since the data length of the position information data output from the amplifier is fixed and the data length of the display device output data output from the display device is an integer multiple of the data length of the position information data when these types of data are transmitted, the data length of any of the data is the same as the fixed data length of the position information data or an integer multiple thereof. Therefore, there is no need to cope with data having various data lengths, and control of data reception in the serial bus control circuit is facilitated.

According to the invention, the motor control system of the numerical controller capable of reducing the cost of the serial bus control circuit, the accompanying connectors, and the serial bus in the motor control system of the numerical controller can be provided.

BRIEF DESCRIPTION OF THE DRAWINGS

The above and other objects and features of the invention will be more apparent from the following detailed description taken in conjunction with the accompanying drawings in which.

DETAILED DESCRIPTION OF THE PREFERRED EMBODIMENTS

A data amount for communication between a numerical controller and a display device is larger than the data amount of a motor command. However, communication does not require such a high degree of real-time properties as in the case of a motor. Therefore, in this embodiment, the display device is connected to a serial bus which is used for a motor command transmitted to an amplifier or position information transmitted from the amplifier.

Figure 1:
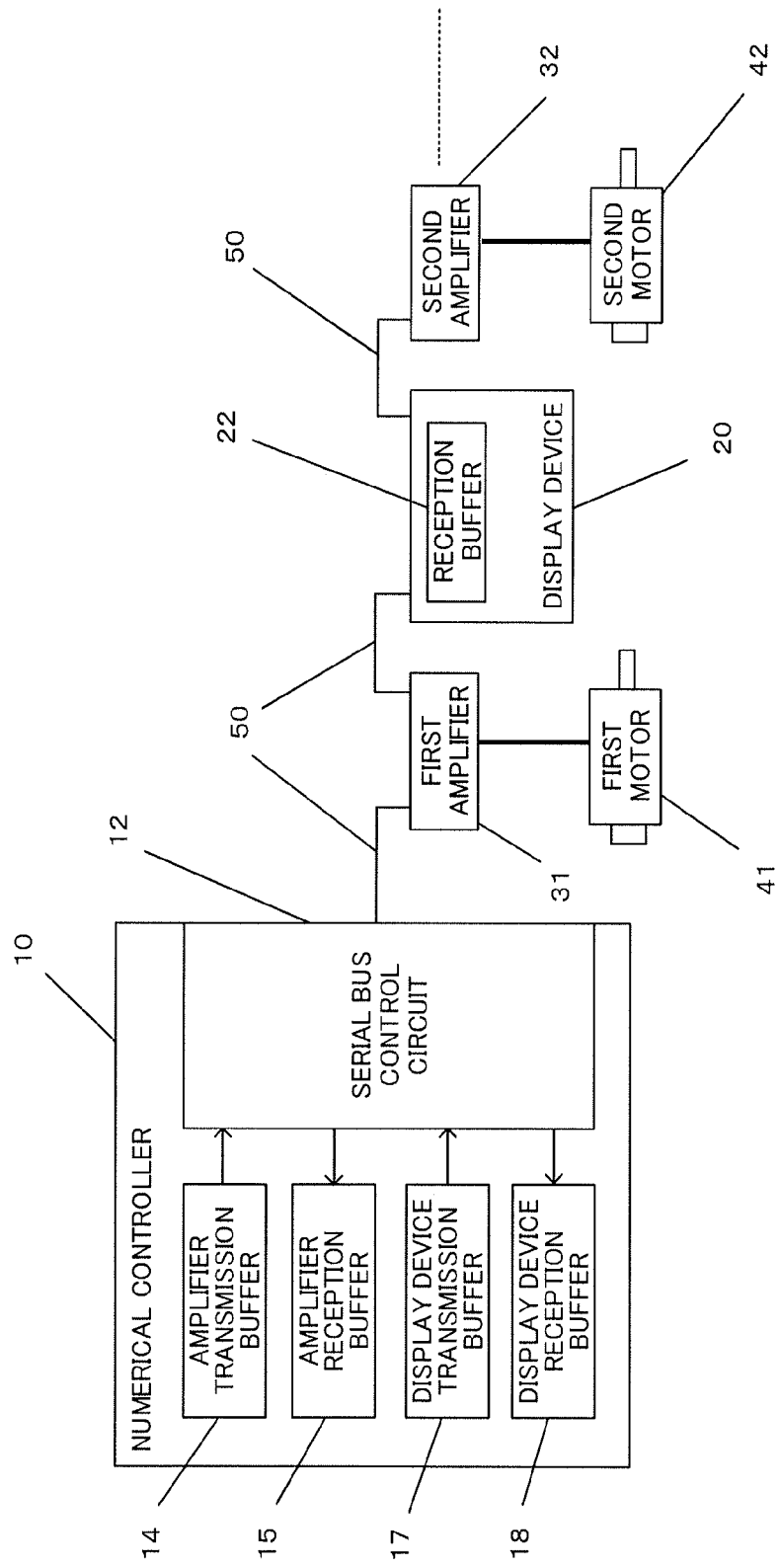
FIG. 1 is a schematic view illustrating a connection state of a numerical controller, amplifiers, and a display device which are included in a motor control system according to the invention.

FIG. 1 is a schematic view illustrating a connection state of the numerical controller, the amplifiers, and the display device which are included in a motor control system according to the invention.

In a numerical controller 10, a serial bus control circuit 12, an amplifier transmission buffer 14, an amplifier reception buffer 15, a display device transmission buffer 17, and a display device reception buffer 18 are included.

A first amplifier 31 is connected to the serial bus control circuit 12 by a serial bus 50. A first motor 41 is connected to the first amplifier 31 so that the first motor 41 is controlled by the first amplifier 31. Furthermore, a display device 20 is connected to the first amplifier 31 by the serial bus 50. A reception buffer 22 is included in the display device 20. In addition, a second amplifier 32 is connected to the display device 20 by the serial bus 50. A second motor 42 is connected to the second amplifier 32 so that the second motor 42 is controlled by the second amplifier 32.

To the serial bus control circuit 12 of the numerical controller 10, a motor command for motor control and display data for the display device are input from a data generating unit (not illustrated). Among the motor command and the display data input to the serial bus control circuit 12, the motor command is input to the amplifier transmission buffer 14, and the display data is divided into pieces having the same data length as the motor command to be input to the display device transmission buffer 17. In addition, the serial bus control circuit 12 generates, from the motor command and the display data stored in the amplifier transmission buffer 14 or the display device transmission buffer 17, data to be output to the serial bus 50, depending on the amplifiers 31, 32, . . . , or the display device 20 connected to the serial bus 50, and transmits the generated data to the serial bus 50.

Figure 2:
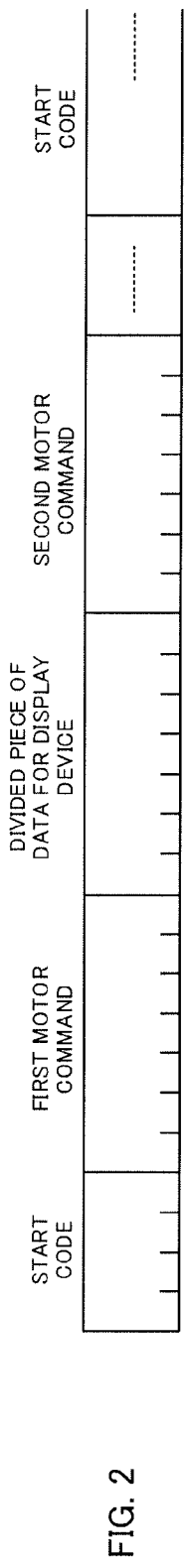
FIG. 2 is a view illustrating an example of the data configuration of a motor command output from the numerical controller of FIG. 1.

FIG. 2 is a view illustrating an example of the data configuration of the motor command which is output from the numerical controller of FIG. 1.

The data of the motor command initially includes a start code which indicates the start of the data and subsequently includes a first motor command, a second motor command, . . . , an N-th motor command and the divided pieces of data for the display device. Each of the amplifiers which receive the data extracts the command for the motor connected thereto, and thereafter transmits the received data to the amplifier in the next stage or the display device 20. When the display device 20 receives the data from the amplifier in the preceding stage, the divided pieces of data for the display device are temporarily accumulated in the reception buffer 22 in the display device 20. The divided pieces of data for the display device in the reception buffer 22 are combined to be used as the display data for the display device 20.

Figure 3:
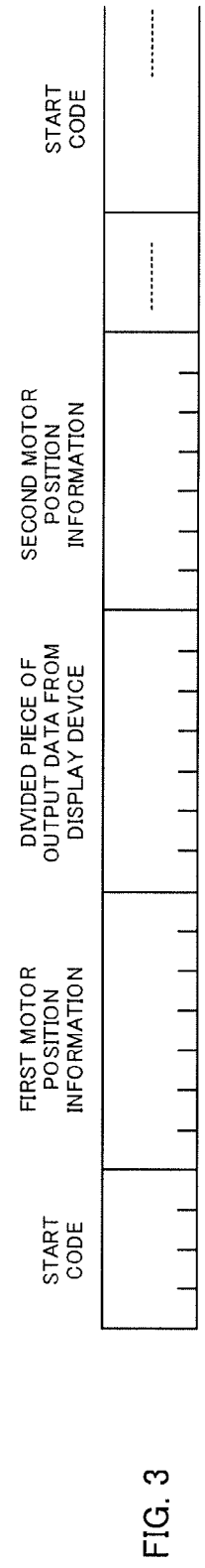
FIG. 3 is a view illustrating an example of the configuration of communication data of position information from each of the amplifiers, which is input to the numerical controller of FIG. 1.

FIG. 3 is a view illustrating an example of the configuration of communication data of the position information from each of the amplifiers, which is input to the numerical controller of FIG. 1.

The communication data initially includes a start code which indicates the start of the data and subsequently includes first motor position information, second motor position information, . . . , N-th motor position information and the divided pieces of data output from the display device 20. Each of the amplifiers which receive the data adds to the data the position information of the motor connected thereto and transmits the resultant data to the amplifier in the next stage (preceding stage). In the same manner, the amplifier in the next stage also adds the position information of the motor connected thereto to the data and transmits the resultant data to the amplifier in the stage after next (preceding stage). The numerical controller 10 which receives the data stores the motor position information from the motor 41, 42, . . . in the amplifier reception buffer 15, temporarily accumulates the divided pieces of output data from the display device 20 in the display device reception buffer 18, and combines the pieces of data in the display device reception buffer 18 to be used as the output data from the display device.

Figure 4:
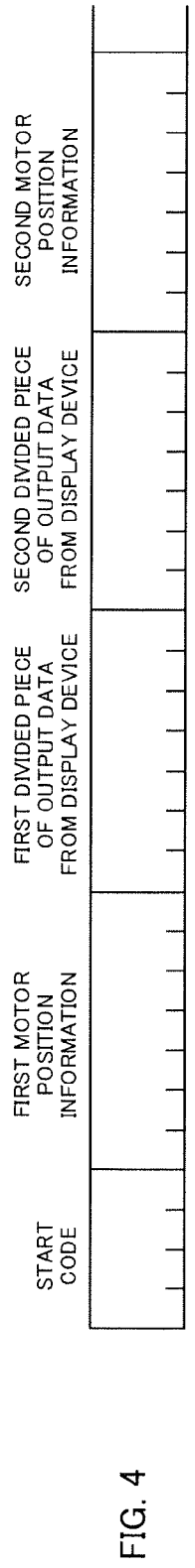
FIG. 4 is a view illustrating a modification example of the data configuration of the motor command, which is output from the numerical controller of FIG. 1.
Figure 5:
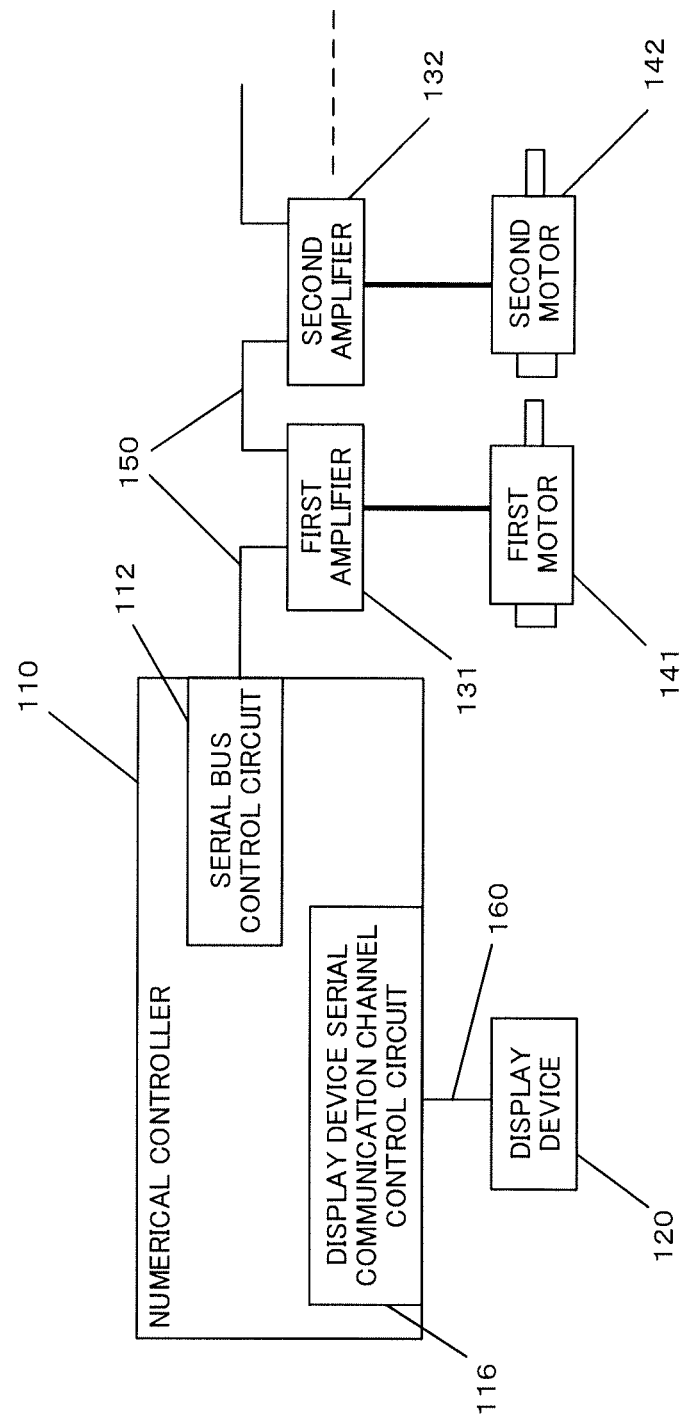
FIG. 5 is a schematic view illustrating a connection state of a numerical controller, motors, and a display device in the related art.
Figure 6:
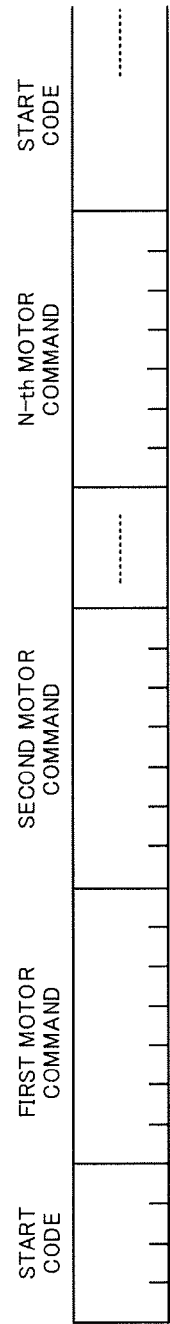
FIG. 6 is a view illustrating the data configuration of a motor command in the related art.
Figure 7:
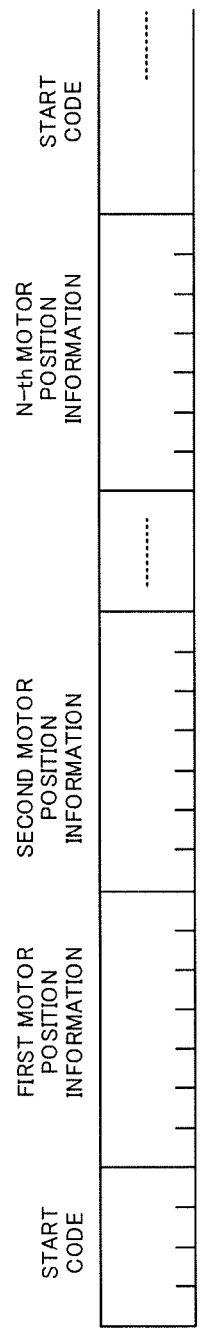
FIG. 7 is a view illustrating the configuration of communication data of position information from each of amplifiers to the numerical controller in the related art.
Figure 8:
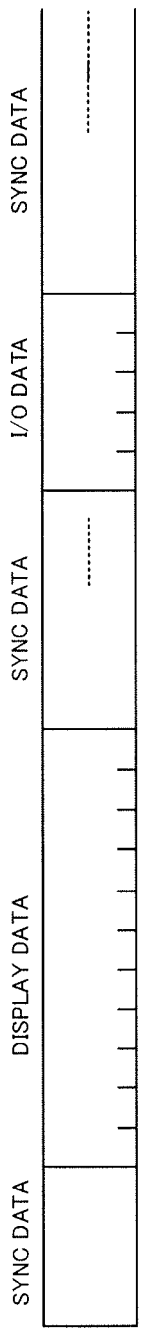
FIG. 8 is a view illustrating the configuration of communication data for the display device in the related art.

FIG. 4 is a view illustrating a modification example of the data configuration of the motor command output from the numerical controller of FIG. 1.

In a case where the number of amplifiers is small and there is a storage space available in the communication data or the like, the data configuration of the motor command illustrated in FIG. 4 is used. That is, a plurality of divided pieces of data for the display device (first divided piece of data for the display device and second divided piece of data for the display device) are arranged between the first motor command and the second motor command. Accordingly, data can be prepared within a short time.

In this embodiment, the data for the display device or the data output from the display device is divided into pieces of data each having the data length that is an integer multiple of the data length of the motor command or the motor position information so as to be sent and received. However, the data length is not limited thereto. Even though a burden on the serial bus control circuit 12 and the like is slightly increased, the data length of the data for the display device or the data output from the display device may be a length that is not an integer multiple of the data length of the motor command.

The invention claimed is:

1. A motor control system comprising:
a numerical controller;
at least one amplifier which drives a motor based on a motor command from the numerical controller;
at least one display device which carries out screen display; and
a single serial bus which connects the numerical controller, the at least one amplifier, and the at least one display device, the numerical controller communicating with both the amplifier and the display device, and the display device in communication with both a first of the at least one amplifier and a second of the at least one amplifier via the single serial bus;
wherein the numerical controller includes a first transmission buffer, a second transmission buffer, and a serial bus control circuit, wherein the first transmission buffer and the second transmission buffer are separate and independent of one another, and wherein the numerical controller does not include the display device and the at least one amplifier, and
the numerical controller calculates the motor command for motor control, stores the calculated motor command in the first transmission buffer, and stores the display data in the second transmission buffer, wherein
the serial bus control circuit outputs the motor command stored in the first transmission buffer and the display data stored in the second transmission buffer to the serial bus, depending on the amplifier or the display device connected to the serial bus,
the amplifier drives the motor based on the motor command received from the numerical controller via the serial bus, and
the display device carries out screen display based on the display data received from the numerical controller via the serial bus, and wherein
a data length of the motor command per motor output from the numerical controller is fixed, and
a data length of the display data transmitted to the display device is an integer multiple of the data length of the motor command.

2. The motor control system according to claim 1,
wherein the numerical controller divides the display data for the display device and outputs those divided pieces of output data, and
the display device includes a buffer that receives and accumulates the divided pieces of display data which are transmitted and combines those divided pieces of display data into a single piece of data.

3. The motor control system according to claim 1,
wherein the display data for the display device includes external output data from the display device, in addition to the data used for carrying out screen display.

4. The motor control system according to claim 1,
wherein the amplifier outputs position information data of a motor connected thereto to the serial bus,
the display device outputs display device output data to the serial bus, and
the numerical controller receives the position information data and the display device output data which are output to the serial bus.

5. The motor control system according to claim 4,
wherein the display device divides the display device output data and outputs those pieces of divided output data to the serial bus, and
the numerical controller includes a buffer that receives and accumulates those divided pieces of output data which are output to the serial bus and combines those divided pieces of output data into a single piece of data.

6. The motor control system according to claim 5,
wherein a data length of the position information data per motor output to the serial bus from the amplifier is fixed, and
a data length of the display device output data output to the serial bus from the display device is an integer multiple of the data length of the position information data.

* * * * *